(12) United States Patent
Beaudet (10) Patent No.: US 12,366,918 B2
(45) Date of Patent: Jul. 22, 2025

(54) AUGMENTED REALITY MACHINING AID

(71) Applicant: Pratt & Whitney Canada Corp., Longueuil (CA)

(72) Inventor: Jeff Beaudet, La Prarie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/463,445

(22) Filed: Sep. 8, 2023

(65) Prior Publication Data
US 2025/0085773 A1 Mar. 13, 2025

(51) Int. Cl.
| | |
|---|---|
| G02B 27/01 | (2006.01) |
| B64F 5/60 | (2017.01) |
| G02B 27/00 | (2006.01) |
| G06F 3/01 | (2006.01) |
| G06Q 10/20 | (2023.01) |

(52) U.S. Cl.
CPC .............. *G06F 3/013* (2013.01); *B64F 5/60* (2017.01); *G02B 27/0093* (2013.01); *G02B 27/0101* (2013.01); *G02B 27/017* (2013.01); *G06Q 10/20* (2013.01); *G02B 2027/0138* (2013.01); *G02B 2027/0141* (2013.01)

(58) Field of Classification Search
CPC .......... G06T 19/006; G02B 2027/0138; G02B 27/0101; G02B 27/0172; G02B 27/017
See application file for complete search history.

(56) References Cited

U.S. PATENT DOCUMENTS

| | | |
|---|---|---|
| 8,070,555 B2 | 12/2011 | Hofer |
| 9,561,571 B2 | 2/2017 | Widens et al. |
| 9,952,438 B1 | 4/2018 | Broadhead et al. |
| 10,796,486 B2 | 10/2020 | Myers |

(Continued)

FOREIGN PATENT DOCUMENTS

| | | |
|---|---|---|
| EP | 3086193 A1 | 10/2016 |
| EP | 3323547 A1 | 5/2018 |

(Continued)

OTHER PUBLICATIONS

European Search report for EP Application EP24199288.2 completed on Feb. 9, 2025.

*Primary Examiner* — Yuzhen Shen
(74) *Attorney, Agent, or Firm* — Carlson, Gaskey & Olds, P.C.

(57) ABSTRACT

A method of visualizing data with respect to a component includes identifying a model of the component. The method further includes accessing part data defining an internal configuration of each of a plurality of models of components. The method further includes associating the internal configuration of the model of the component with the component. The method further includes accessing process data defining a plurality of processing methods applicable to the identified model of the component, and receiving an indicator of a desired processing method out of the processing methods defined by the process data. The method further includes generating a visual overlay on a display based on the process data and the associated internal configuration of the component, wherein the visual overlay includes a guiding visualization for at least one step of the desired processing method associated with at least one feature of the internal configuration of the component.

20 Claims, 6 Drawing Sheets

(56) References Cited

U.S. PATENT DOCUMENTS

2016/0061050 A1\* 3/2016 Keenan ................ F01D 11/122
                                                                         415/118
2018/0130376 A1\* 5/2018 Meess ...................... G09B 5/06
2019/0012837 A1\* 1/2019 Myers ................ G06F 3/03547

FOREIGN PATENT DOCUMENTS

| EP | 3822743 A1 | 5/2021 | | |
|----|------------|--------|----|----|
| WO | WO-2004055325 A1 \* | 7/2004 | ............. | E21B 44/00 |

\* cited by examiner

AUGMENTED REALITY MACHINING AID

BACKGROUND

This disclosure relates to methods and systems for providing an augmented reality or visual overlay to aid users in performing disassembly and repair processes.

Certain disassembly and repair processes require precision for optimal results. For example, when parts are removed from a gas turbine engine for repair or replacement, it may be important to cut and/or drill along a particular path and in a particular orientation. If such processes are not done correctly, internal components may be damaged or it may become more difficult to reinstall the removed part after repair.

SUMMARY

An exemplary method of visualizing data with respect to a component includes identifying, at a computing device, a model of the component. The method further includes accessing, at the computing device, part data defining an internal configuration of each of a plurality of models of components, the part data including the model of the component. The method further includes associating, at the computing device, the internal configuration of the model of the component with the component. The method further includes accessing, at the computing device, process data defining a plurality of processing methods applicable to the identified model of the component, and receiving, at the computing device, an indicator of a desired processing method out of the processing methods defined by the process data. The method further includes generating, by the computing device, a visual overlay on a display based on the process data and the associated internal configuration of the component, wherein the component is visible when the display is positioned between a user's eye and the component, and wherein the visual overlay includes a guiding visualization for at least one step of the desired processing method associated with at least one feature of the internal configuration of the component.

In another example of the above described exemplary method, the guiding visualization includes a visual indication of a correct tool path of a tool associated with the desired processing method.

In another example of any of the above described exemplary methods, the generating the visual overlay includes providing a visual warning associated with the desired processing method.

In another example of any of the above described exemplary methods, the desired processing method is a machining process and the generating the visual overlay includes providing a removal indicator that indicates portions of the component to be removed as part of the machining process.

Another example of any of the above described exemplary methods further includes capturing perception data indicative of the user's field-of-view of the component, and wherein the generating the visual overlay is based on the perception data.

In another example of any of the above described exemplary methods, the generating the visual overlay includes aligning at least part of the visual overlay with a visual vector, the visual vector extending between the user's eye and a feature of the internal configuration of the component when the display is positioned between the user's eye and the component.

In another example of any of the above described exemplary methods, the identifying the model of the component includes comparing the perception data with the part data.

In another example of any of the above described exemplary methods, the generating the visual overlay includes providing a feedback indicator that is responsive to actions of the user captured within the perception data.

In another example of any of the above described exemplary methods, the feedback indicator includes a first visual indication if movement of a tool by the user matches a correct tool path stored in the process data and a second visual indication if the movement does not match the correct tool path.

In another example of any of the above described exemplary methods, the first visual indication includes highlighting the tool in a first color and wherein the second visual indication includes highlighting the tool in a second color different from the first color.

In another example of any of the above described exemplary methods, the generating the visual overlay includes generating outlines that are indicative of the internal configuration of the component.

In another example of any of the above described exemplary methods, the desired processing method is associated with removing a component from a gas turbine engine.

In another example of any of the above described exemplary methods, the display comprises a wearable display device.

In one exemplary embodiment a system for visualizing data with respect to a component includes a computing device including a memory, wherein the memory stores part data defining an internal configuration of each of a plurality of models of components, and stores process data defining a plurality of processing methods applicable to the plurality of models of components. The computing device is configured to identify a model of the component, and associate the component with an internal configuration of the model of the component defined in the part data. The computing device is further configured to receive an indicator of a desired processing method out of the processing methods defined by the process data. The computing device is further configured to generate a visual overlay for a display based on the process data and the associated internal configuration of the component, wherein the component is visible when the display is positioned between a user's eye and the component, and wherein the visual overlay includes a guiding visualization for at least one step of the desired processing method associated with at least one feature of the internal configuration of the component.

In another example of the above described system, the guiding visualization includes a visual indication of a correct tool path of a tool associated with the desired processing method.

In another example of any of the above described systems, the visual overlay includes an outline that is indicative of the internal configuration of the component.

Another example of any of the above described systems includes a perception sensor configured to capture perception data indicative of the user's field-of view of the component, and wherein the computing device is configured to generate the visual overlay based on the perception data.

Another example of any of the above described systems further includes a wearable display device, the wearable display device including the perception sensor and the display.

In another example of any of the above described systems, the visual overlay includes a feedback indicator that is responsive to actions of the user captured within the perception data.

In another example of any of the above described systems, the feedback indicator includes a first visual indication if movement of a tool by the user matches a correct tool path stored in the process data and a second visual indication if the movement does not match the correct tool path.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible

DETAILED DESCRIPTION

Figure 1:
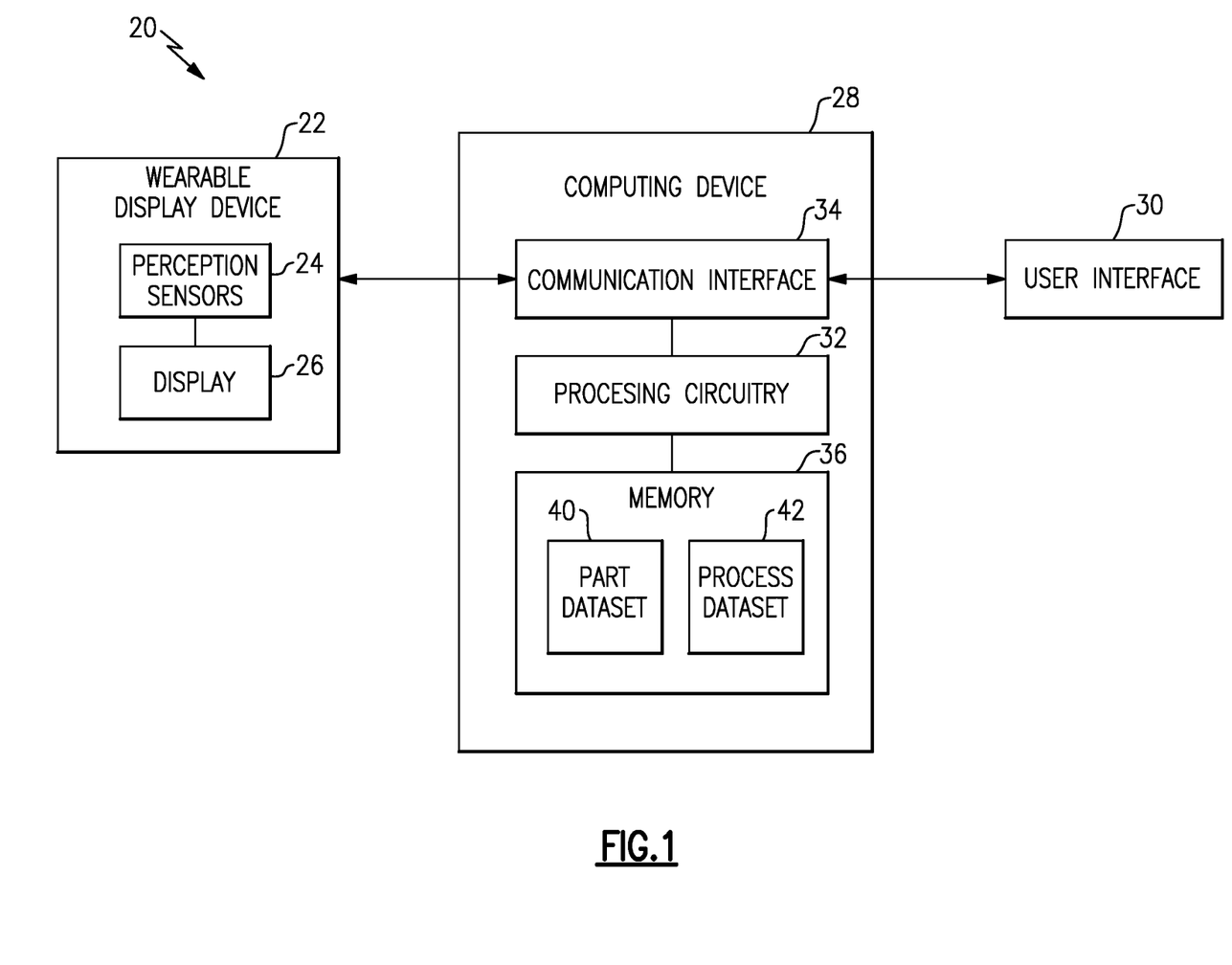
FIG. 1 schematically illustrates an example machining aid system.

FIG. 1 schematically illustrates an example machining aid system 20. The machining aid system 20 is configured to provide an augmented reality or visual overlay to a user to provide useful information and directions as the user performs a processing method on the component. A "visual overlay" in this description is a projection of imagery or information over a user's natural vision or field-of-view. In a non-limiting example, the processing method is a disassembly or repair process relating to the removal of a sub-component from a larger assembly, such as removal of a sub-component from a gas turbine engine for repair and replacement. The machining aid system 20 may facilitate such removal in an optimal manner that avoids damage to any internal components of the assembly, particularly when such internal components would otherwise be obscured from a user's field of view (i.e., a "blind" machining operations).

The machining aid system 20 includes a wearable display device 22 capable of providing a visual overlay to a user. The wearable display device 22 may be configured as googles, glasses, lenses, or any other display positioned between the eyes of the user and a component being worked on such that the component is visible to the user through the display. Although this disclosure references a wearable display device 22, it should be understood that the systems and methods of this disclosure may utilize any other type of non-wearable display, such as computer screens, tablets, smartphones, etc.

The wearable display device 22 includes one or more perception sensors 24 and a display 26. The machining aid system 20 further includes a computing device 28 and a user interface 30, both of which may be provided as a unit with the wearable display device 22 or may be provided remote from the wearable display device 22.

The perception sensors 24 may comprise one or more of a camera, a magnetometer, an accelerometer, gyroscopic sensors, and/or any other sensor capable of tracking movement and positioning. In examples where the perception sensors 24 include a camera, the camera is directed forward on the wearable display device 22 to capture real-time images of the user's field of view. The perception sensors 24 are configured to communicate signals indicative of the user's orientation, perception, and/or field-of-view to the computing device 28.

The display 26 may comprise any known method of displaying an augmented reality to a user, such as, but not limited to, a curved mirror display or a waveguide display.

As discussed further below, the computing device 28 determines what virtual images to generate and display to the user and where in the user's field-of-view to overlay such images. Once the computing device 28 generates a visual overlay, the computing device may instruct the display 26 to provide that visual overlay to the user. The computing device 28 may be a single hardware device, a plurality of hardware devices distributed among different locations which collectively perform the methods of this disclosure, a virtual machine supported by underlying hardware, or any combination of the foregoing types and arrangements of computing devices.

The user interface 30 allows a user to turn on and off the wearable display device 22 and also select a desired function of the machining aid system 20. The user interface 30 may generally comprise buttons or a touch pad local to the wearable display device 22, or may be a remote device, such as a separate computer.

The computing device 28 includes processing circuitry 32 operatively connected to a communication interface 34 and memory 36. The processing circuitry 32 may include one or more microprocessors, microcontrollers, application specific integrated circuits (ASICs), of the like. As used herein, the term "processing circuitry" is not limited to a single computing device, and may connote processing functionality spread across multiple devices (e.g., across multiple servers).

The communication interface 34 is configured to facilitate communication between the computing device 28 and other devices of the machining aid system 20, such as the perception sensors 24, the display 26, and the user interface 30.

The memory 36 can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). Moreover, the memory 36 may incorporate electronic, magnetic, optical, and/or other types of storage media. The memory 36 can also have a distributed architecture, where various components are situated remotely from one another, but can all be accessed by the processing circuitry 32.

In an example the memory 36 stores a part dataset 40 and a process dataset 42. The part dataset 40 includes data defining the three-dimensional shape of various models of components, including data defining the internal configuration of such models of components. In this disclosure, a "component" may refer to both an individual manufactured part or an assembly of manufactured parts, such as a gas turbine engine. A "model" of the component may refer to a specific type and configuration of a component. "Internal configurations" may include the three-dimensional shape of structures and assemblies within a component which may be blocked from view by an exterior of the component. In an example, the part dataset 40 includes data relating to the three-dimensional shape of a plurality of different gas turbine engine models, including shape and location data relating to the internal configurations of such engines.

The process dataset 42 includes data relating to various processing methods that may be performed on the components of the part data 40. As noted above, the processing methods of this disclosure may relate to disassembly and repair processes, however it should be understood that the teachings of this disclosure are also applicable to manufacturing processes, finishing processes, or any other type of processing method. In an example, the process dataset 42 includes data of processing methods that are associated with the removal of one or more components from a gas turbine engine for repair or replacement.

As will be discussed further below, the process dataset 42 may include guiding visualizations associated with each processing method, such as instructions to accomplish the processing method, an optimal tool path for a tool used in the processing method, and useful warning messages that are associated with the processing method. In this disclosure, "tool path" refers to the movement of a tool in three-dimensional space relative to a component being worked on, and may also include specific angular orientations of the tool during such movement. Tool paths stored in the process dataset 42 may include a specific tolerance, or the tool paths may comprise an acceptable range of tool movements and orientations.

Figure 2:
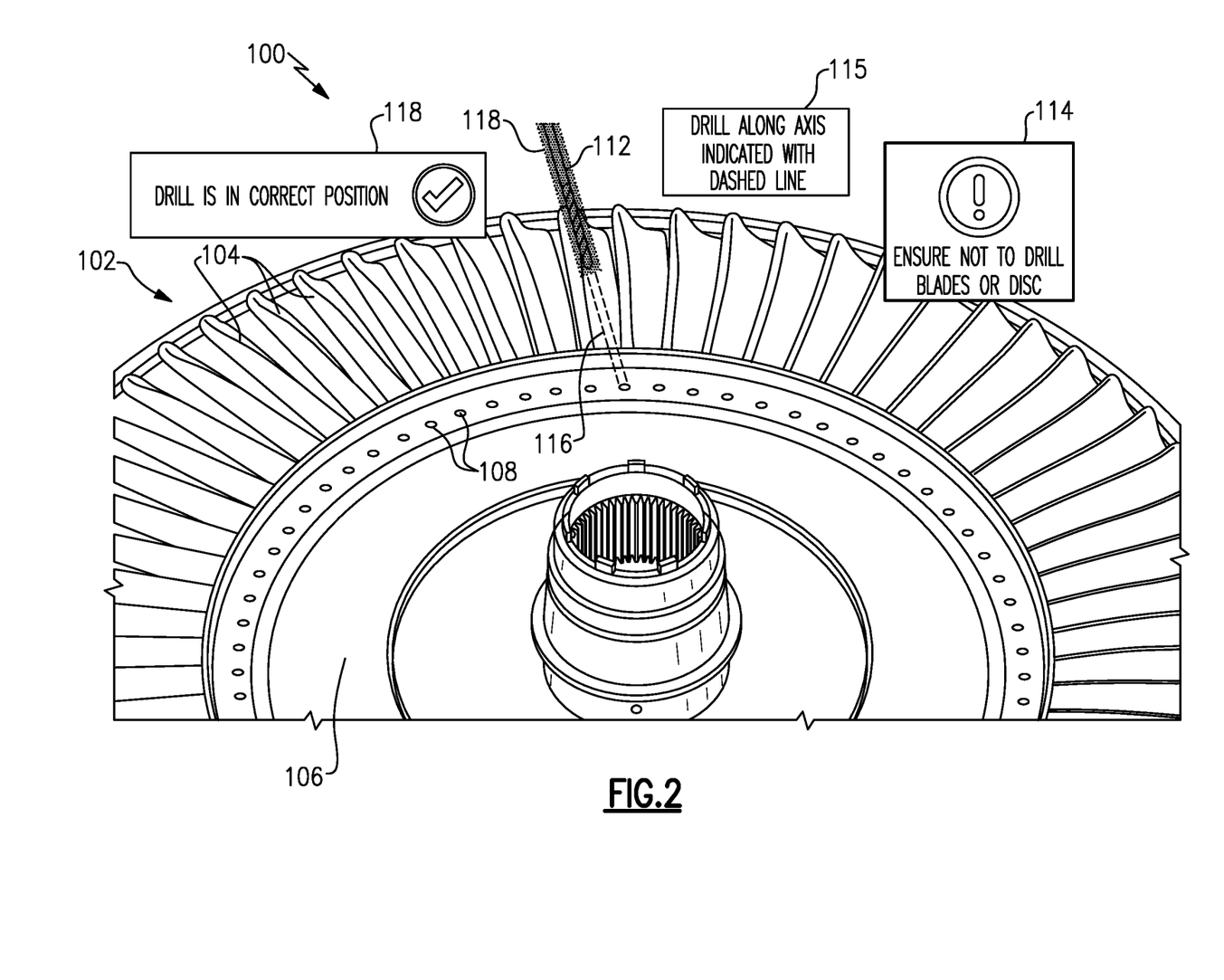
FIG. 2 illustrates an example visual overlay of the machining aid system of FIG. 1.

FIG. 2 illustrates an example visual overlay 100 generated by the machining aid system 20. In this example, the subject component is a bladed rotor 102 of a gas turbine engine, and more specifically a power turbine disc assembly. However, it should be understood that the teachings of visual overlay 100 may be applicable to any riveted assembly. The bladed rotor 102 includes a plurality of blades 104 that are secured to a disk 106 with pop rivets 108. The pop rivets 108 extend through a slot 110 (shown in FIG. 4) formed in both the blades 104 and the disk 106. The desired machining process in this example includes using a drill 112 to drill through the pop rivets 108 to disconnect and allow removal of one or more of the blades 104, for example for repair or replacement. It is important during such a process to orient the drill 112 such that it is directly aligned with the pop rivets 108 to avoid damage to the blades 104 and disk 106.

The visual overlay 100 illustrates several guiding visualizations that may be added to a user's field-of-vision to aid in the desired processing method. First, the visual overlay 100 includes a warning 114, which may be a projection of text into the user's field-of-view that instructs the user to avoid doing a certain action or avoid damaging a certain component. The visual overlay 100 in this example further includes an instruction 115. The instruction 115 may be a projection of text that describes actions that the user should take during the machining process. In an example, the instruction 115 may update or change as the user completes steps in a multi-step process.

The warning 114 and/or instruction 115 may be provided in a nonobtrusive position, such as towards a periphery of the user's field-of-view. In another example, the warning 114 and/or instruction 115 may be tied to a specific component such that the visual indicator remains proximate to that component regardless of any movement of the user's field-of-view.

The visual overlay 100 also includes a guiding visualization of a correct tool path 116 of the tool 112 being used by an operator (i.e., the drill 112 in this example). The tool path 116 may be displayed as a three-dimensional line that indicates a path that the tool 112 should move along. The tool path 116 may also be displayed as a phantom or augmented reality version of the tool 112 moving along a desired path in a desired orientation.

The visual overlay 100 may also be adjusted in real time based on actions of the user captured by the perception sensors 24. In this example, the visual overlay 100 further includes a feedback indicator 118 which provides a visual indication to the user if information communicated by the perception sensors 24 indicates that the user has moved the tool 112 outside of the correct tool path 116. In one example, the feedback indicator 118 includes providing a highlighting or aura surrounding the tool 112. The tool 112 is highlighted in a first color (e.g., green) if the user is moving the tool 112 along a correct tool path 116 and the tool 112 is highlighted in a second color (e.g., red) if the user moves the tool 112 outside of the correct tool path 116.

Figure 3:
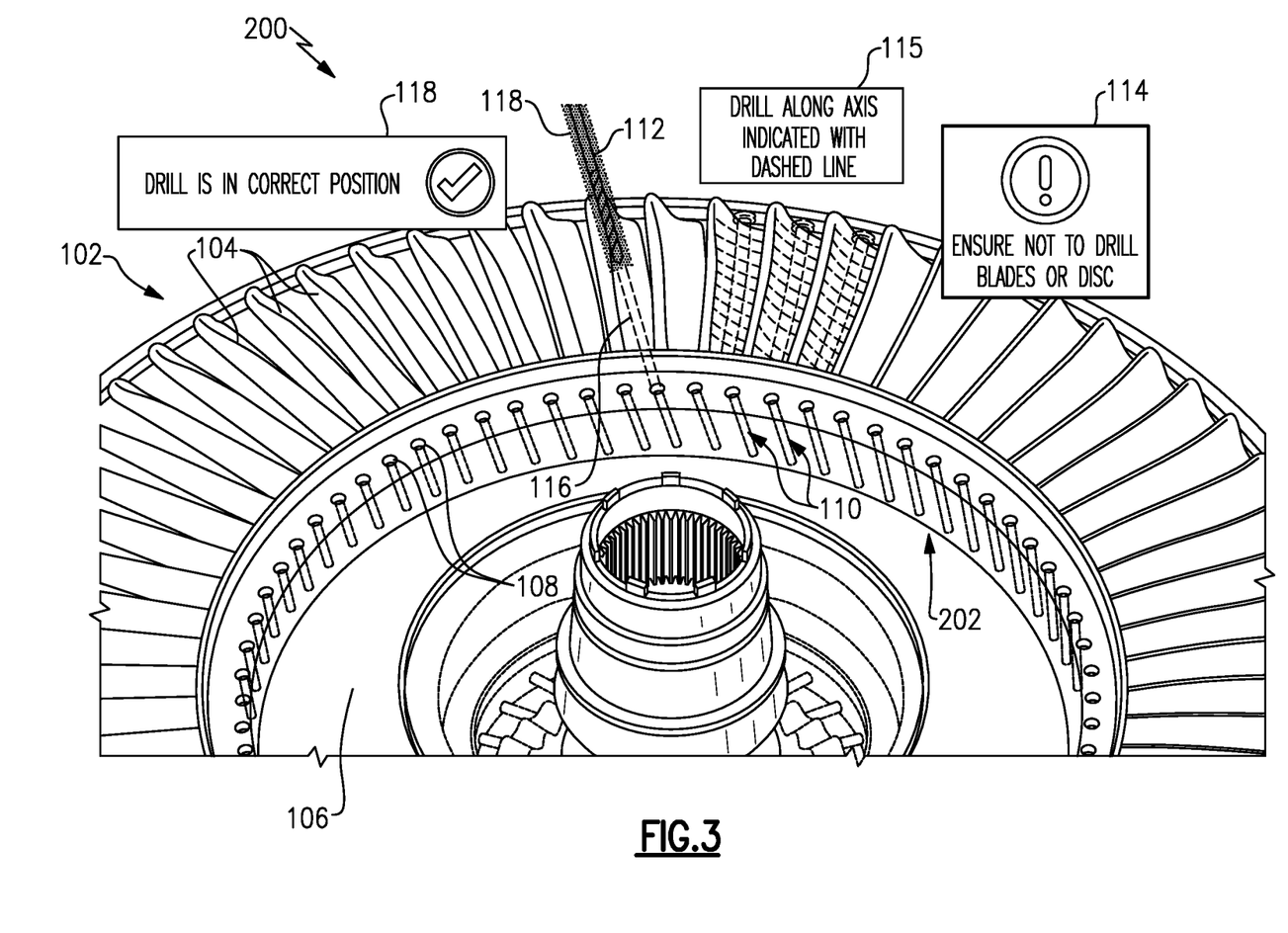
FIG. 3 illustrates a second example visual overlay of the machining aid system of FIG. 1.

FIG. 3 illustrates a second example visual overlay 200. The visual overlay 100 is similar to the visual overlay 100 in that it involves the same desired processing method and same subject components, i.e., drilling through pop rivets 108 to disconnect a blade 104 from the disk 106 of a bladed rotor 102. However, the visual overlay 200 additionally includes internal configuration details 202 of the subject component. In this example, the visual overlay 200 shows internal configuration details 202 of the pop rivets 108, slots 110, blades 104, and disk 106 that would otherwise be blocked from the user's view by the exterior, user-facing surfaces of these components. The internal configuration details 202 may be displayed as a three-dimensional outline overlaid in the user's vision over exterior surfaces, such that to the user it appears as if they can see through exterior surfaces to see details of the internal configuration of the subject component.

Figure 4:
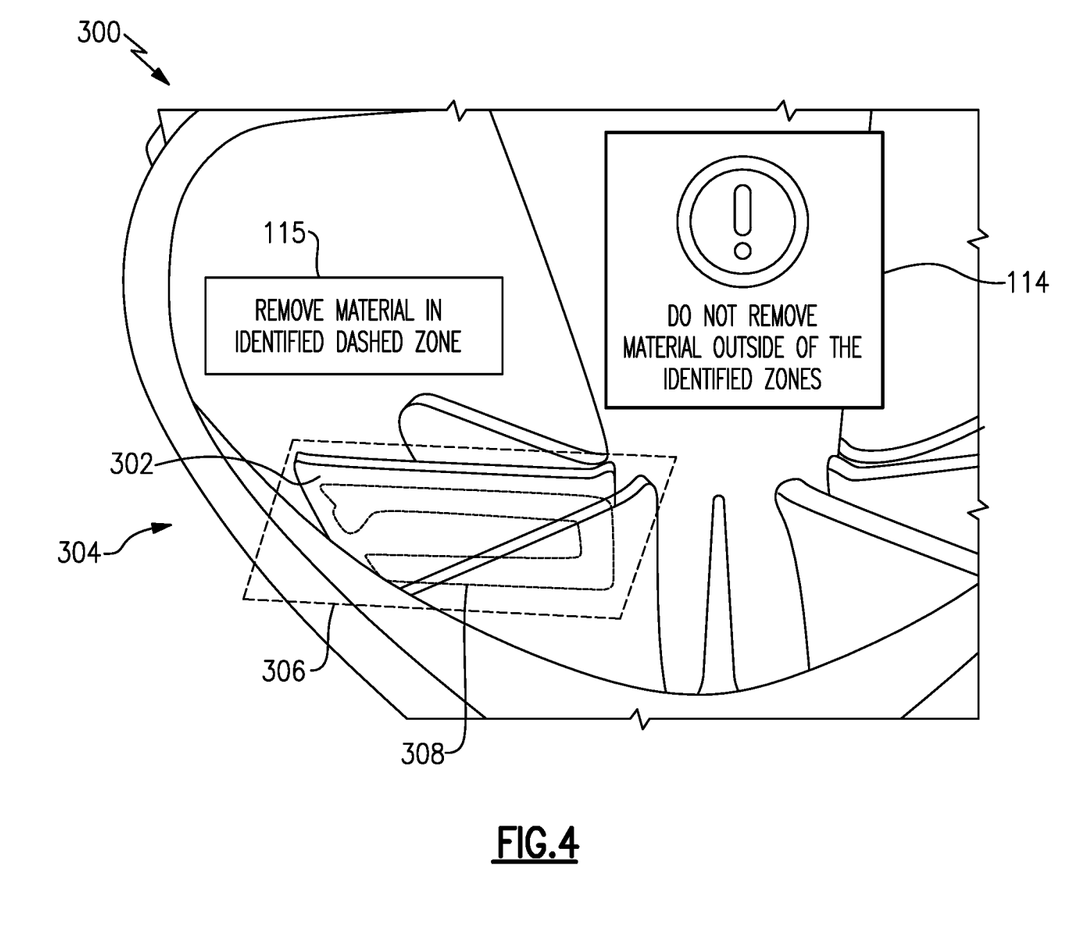
FIG. 4 illustrates a third example visual overlay of the machining aid system of FIG. 1.

FIG. 4 illustrates a third example visual overlay 300. In this example, the subject component is a vane 302 of a front inlet case and the desired processing method involves cutting away or otherwise removing certain portions of the vane 302. However, it should be understood that the teachings of visual overlay 300 may applicable to any part or process where hidden features or assemblies are not visible to the machining operator. The visual overlay 300 in this example includes a removal indicator 304. The removal indicator 304 may include a projected box 306 or other highlighting that surrounds the component, or portion thereof, that should be removed during the processing method. The removal indicator 304 may also provide boundary lines 308 which denote a boundary of the portion of the subject component that should be cut away or removed during the processing method.

Figure 5:
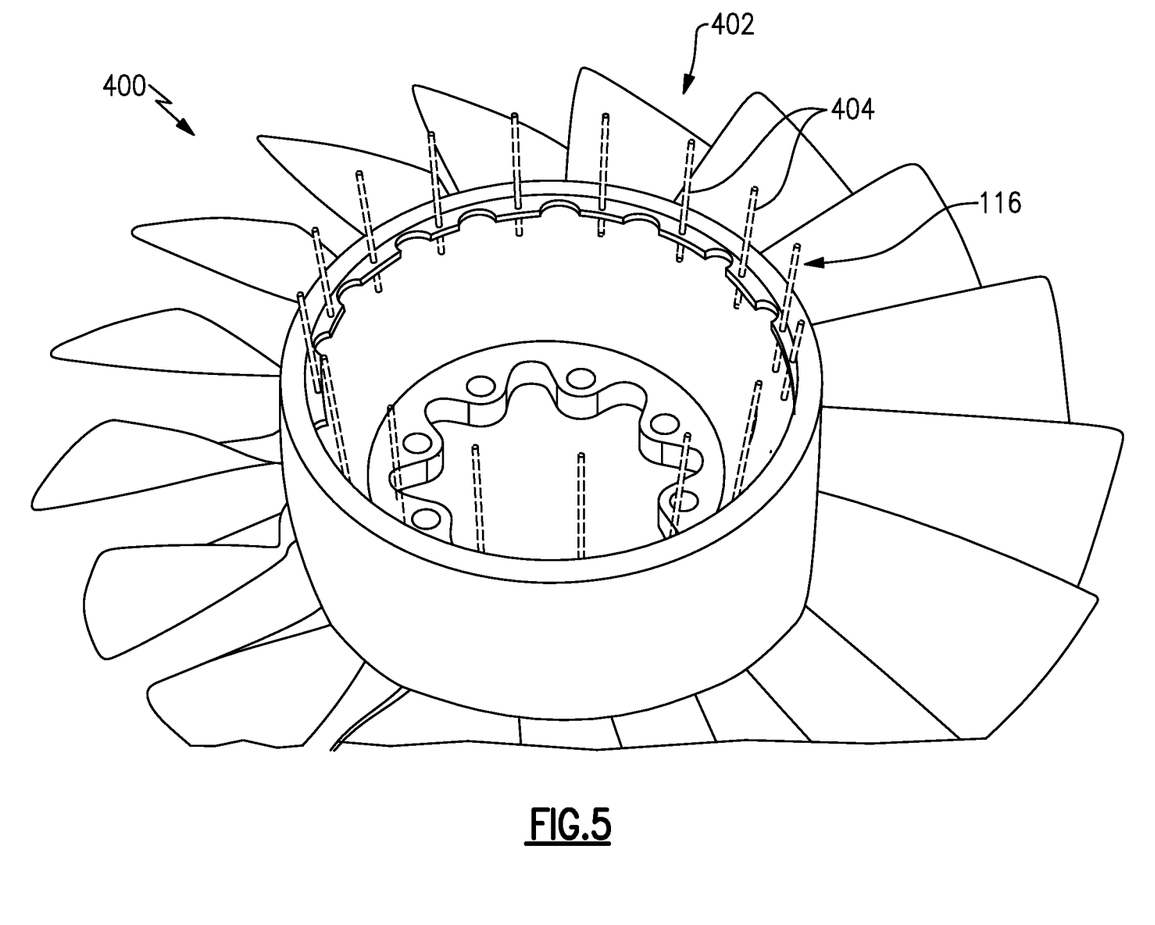
FIG. 5 illustrates a fourth example visual overlay of the machining aid system of FIG. 1

FIG. 5 illustrates a fourth example visual overlay 400. In this example, the subject component is an integrally bladed rotor 402 and the desired processing method is the removal of rivets (not shown) from the integrally bladed rotor 402 by drilling through the rivets. The visual overlay 400 includes a tool path indicator 116 that is configured as three-dimensional cylindrical projections 404 extending through each of the rivets. The cylindrical projections 404 extend through the rivets at an angular orientation that the user should match with the drill 112 when performing the processing method.

Figure 6:
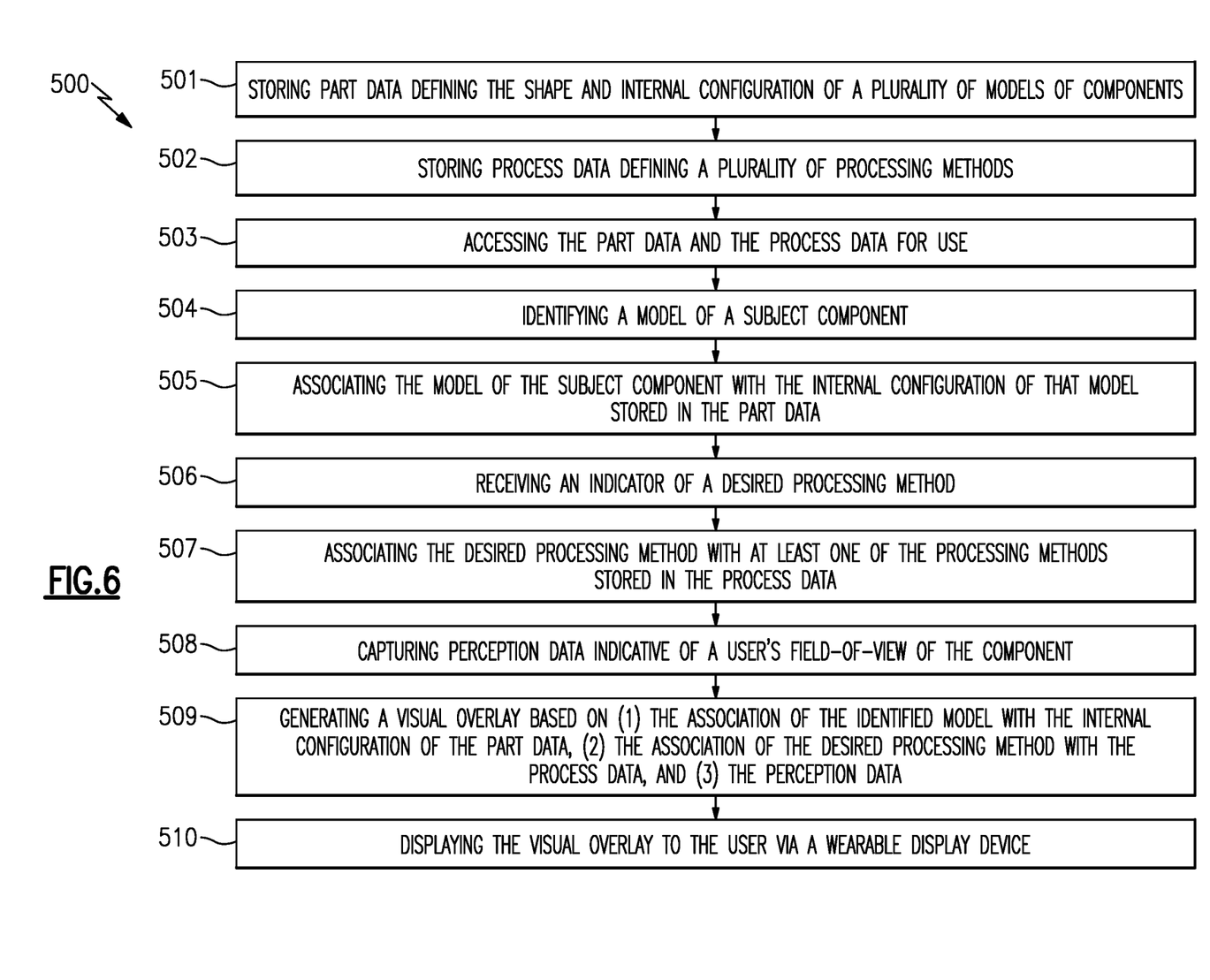
FIG. 6 is a flowchart of an example method for visualizing data with respect to a component.

FIG. 6 illustrates a method 500 for visualizing data with respect to a subject component while performing a desired processing method on the component. The method 500 may be performed by the machining aid system 20.

At step 501, data defining the shape and internal configuration of each of a plurality of models of components is stored as the part dataset 40 of the memory 36 of the computing device 28. Step 501 may include loading data of CAD files of part designs or data from scans of parts and assemblies as manufactured into the memory 36. At step 502, data defining a plurality of processing methods applicable to the component models of the part dataset 40 are stored as the process dataset 42 of the memory 36. In an example, portions of the process dataset 42 may be captured by the perception sensors 24 of the machining aid system 20. For example, the machining aid system 20 may first capture training data based on an operator performing a machining process correctly, and that training data may form part of the process dataset 42 used to generate a visual overlay.

At step 503, the part dataset 40 and process dataset 42 are accessed for use, for example by the processing circuitry 32.

At step 504, a model of the subject component is identified. Step 504 may include a user providing a manual input through the user interface 30. For example, the user may instruct the computing device 28 which specific component model the desired machining process will be performed on. As a more specific example, the user may manually provide the specific gas turbine engine model that the desired machining process is being performed on. In another example, step 504 may include the processing circuitry 32 comparing images of the subject component captured by the perception sensors 24 with the part dataset 40. For example, the processing circuitry 32 may recognize a specific component model by its shape or by any identifying information captured by the perception sensors 24, such as a serial number.

At step 505, the model of the component identified in step 504 is associated with the internal configuration of that model stored in the part dataset 40.

At step 506, an indicator of a desired processing method intended to be performed is received. Step 506 may include a user providing a manual input through the user interface 30. For example, the user may instruct the computing device 28 of a desired processing method.

At step 507, the desired processing method is associated with at least one of the processing methods stored in the process dataset 42. For example, step 508 may include the processing circuitry 32 associating, or matching, the selected processing method with data or information related to the processing method that is stored in the process dataset 42.

At step 508, perception data indicative of a user's vision or field-of-view is captured, including the user's view of the component. In an example, the perception data is captured by one or more perception sensors 24 of the wearable display device 22.

At step 509, a visual overlay is generated based on (1) the association of the identified model of the subject component with the internal configuration details of the part dataset 40, (2) the association of the desired processing method with the process dataset 42, and (3) perception data communicated from the perception sensors 24. Step 509 includes the processing circuitry 32 pulling relevant guiding visualizations, such as warnings 114, instructions 115, tool paths 116, feedback indicators 118, internal configuration details 202, and removal indicators 302 from the process dataset 42 based on the associations of steps 505 and 507. Step 509 further includes the processing circuitry 32 analyzing data communicated from the perception sensors 24 to determine where in the user's field-of-view to provide the relevant guiding visualizations as a visual overlay 100, 200, 300 that provides useful information and instruction to aid with the desired processing method.

In an example, the generated visual overlay includes a guiding visualization for at least one step of the desired processing method that is associated with at least one feature of the internal configuration of the component. For example, a warning 114, instruction 115, tool path 116, feedback indicator 118, or removal indicator 302 may be provided for a step that could potentially involve damage to an internal feature of the component if the step is done incorrectly.

Step 509 may involve model based targeting and tracking, which allows virtual objects to appear as if they are anchored to and interact with objects in the user's field-of-view. The model based tracking of step 506 may be as know, but generally includes (1) generating a three-dimensional model of a real-world environment using computer vision techniques, (2) capturing an image of the real-world scene with a camera and aligning the three-dimensional model, (3) continuously tracking movement objects in the real-world scene and comparing the captured movements with the three-dimensional model to determine a position and orientation of the camera, (4) rendering virtual objects based on the position and orientation such that they appear to be properly aligned with the real-world scene. In an example, step 509 includes aligning the visual overlay with a visual vector determined by the perception sensors 24, the visual vector extending between the user's eyes and a feature of the component, such as a feature of the internal configuration of the component. In other examples, various other known tracking methods may be used, such as marker-based tracking, feature-based tracking, or sensor-based tracking.

Step 509 may also include continuously updating the generated visual overlay as the user performs the desired processing method. For example, based on data obtained from the perception sensors 42, the processing circuitry 32 may determine that a certain step in the process has been completed and the processing circuitry 32 may subsequently generate an updated visual overlay associated with a next step in the desired processing method. Further, as discussed above, the visual overlay may include a feedback indicator 118 to provide real-time feedback as the user performs the processing method.

At step 510, the visual overlay is displayed to the user via the wearable display device 22. In an example, at step 510 the display 26 of the wearable display device 22 is positioned between a user's eye and the subject component and the component is visible through the display 26.

The machining aid system 20 and method 500 of this disclosure provides data and information in an easily accessible manner to aid a user performing a desired processing method. The user may beneficially receive step-by-step instructions 115 without needing to take their eyes and focus off of the subject component and processing method. As well as making the processing method easier for the user and more efficient, the machining aid system 20 may avoid unnecessary or undesirable damage. The inclusion of warnings 114, instructions 115, tool paths 116, and removal indicators 304 help to ensure that the user performs the machining process correctly. Further, inclusion of internal configuration details 202 allows the user to be cognizant of internal structures and avoid causing any unintended damage to such internal structures during a machining process.

Although embodiments have been disclosed, a worker of skill in this art would recognize that modifications and variations would come within the scope of this disclosure. For that reason, the following claims should be studied to determine the true scope and content of this disclosure.

What is claimed is:

1. A method of visualizing data with respect to a component, comprising:
   identifying, at a computing device, a model of the component;

accessing, at the computing device, part data defining an internal configuration of each of a plurality of models of components, the part data including the model of the component;
associating, at the computing device, the internal configuration of the model of the component with the component;
accessing, at the computing device, process data defining a plurality of processing methods applicable to the identified model of the component;
receiving, at the computing device, an indicator of a desired processing method out of the processing methods defined by the process data; and
generating, by the computing device, a visual overlay on a display based on the process data and the associated internal configuration of the component, wherein the component is visible when the display is positioned between a user's eye and the component, wherein the visual overlay includes a guiding visualization for at least one step of the desired processing method associated with at least one feature of the internal configuration of the component, and wherein the generating the visual overlay includes generating outlines that are indicative of the internal configuration of the component.

2. The method of claim 1, wherein the guiding visualization includes a visual indication of a correct tool path of a tool associated with the desired processing method.

3. The method of claim 2, wherein the visual indication of the correct tool path includes a three-dimensional line.

4. The method of claim 2, wherein the visual indication of the correct tool path provides a tool path that avoids contact of the tool with the at least one feature of the internal configuration of the component.

5. The method of claim 1, wherein the generating the visual overlay includes providing a visual warning associated with the desired processing method.

6. The method of claim 1, wherein the desired processing method is a machining process and the generating the visual overlay includes providing a removal indicator that indicates portions of the component to be removed as part of the machining process.

7. The method of claim 1, further comprising capturing perception data indicative of the user's field-of-view of the component, and wherein the generating the visual overlay is based on the perception data.

8. The method of claim 7, wherein the generating the visual overlay includes aligning at least part of the visual overlay with a visual vector, the visual vector extending between the user's eye and a feature of the internal configuration of the component when the display is positioned between the user's eye and the component.

9. The method of claim 7, wherein the identifying the model of the component includes comparing the perception data with the part data.

10. The method of claim 7, wherein the generating the visual overlay includes providing a feedback indicator that is responsive to actions of the user captured within the perception data.

11. The method of claim 10, wherein the feedback indicator includes a first visual indication if movement of a tool by the user matches a correct tool path stored in the process data and a second visual indication if the movement does not match the correct tool path.

12. The method of claim 11, wherein the first visual indication includes highlighting the tool in a first color and wherein the second visual indication includes highlighting the tool in a second color different from the first color.

13. The method of claim 1, wherein the desired processing method is associated with removing a component from a gas turbine engine.

14. The method of claim 1, wherein the display comprises a wearable display device.

15. A system for visualizing data with respect to a component, comprising:
a computing device including a memory, wherein the memory stores part data defining an internal configuration of each of a plurality of models of components, and stores process data defining a plurality of processing methods applicable to the plurality of models of components;
wherein the computing device is configured to:
identify a model of the component;
associate the component with an internal configuration of the model of the component defined in the part data,
receive an indicator of a desired processing method out of the processing methods defined by the process data, and
generate a visual overlay for a display based on the process data and the associated internal configuration of the component, wherein the component is visible when the display is positioned between a user's eye and the component, wherein the visual overlay includes a guiding visualization for at least one step of the desired processing method associated with at least one feature of the internal configuration of the component, and wherein the visual overlay includes an outline that is indicative of the internal configuration of the component.

16. The system of claim 15, wherein the guiding visualization includes a visual indication of a correct tool path of a tool associated with the desired processing method.

17. The system of claim 15, further comprising a perception sensor configured to capture perception data indicative of the user's field-of-view of the component, and wherein the computing device is configured to generate the visual overlay based on the perception data.

18. The system of claim 17, further comprising a wearable display device, the wearable display device including the perception sensor and the display.

19. The system of claim 17, wherein the visual overlay includes a feedback indicator that is responsive to actions of the user captured within the perception data.

20. The system of claim 19, wherein the feedback indicator includes a first visual indication if movement of a tool by the user matches a correct tool path stored in the process data and a second visual indication if the movement does not match the correct tool path.

* * * * *